US012803922B2

(12) United States Patent
Panakanapalli et al.

(10) Patent No.: US 12,803,922 B2
(45) Date of Patent: Nov. 17, 2026

(54) MODIFYING MODEM TIMERS BASED ON JITTER TIMING ASSOCIATED WITH AN APPLICATION

(71) Applicant: QUALCOMM Incorporated, San Diego, CA (US)

(72) Inventors: Naveen Kumar Panakanapalli, San Diego, CA (US); Sitaramanjaneyulu Kanamarlapudi, San Diego, CA (US); Rajendra Chiguluri, San Diego, CA (US); Aditya Namjoshi, San Diego, CA (US); Arun Prasanth Balasubramanian, San Diego, CA (US); Leena Zacharias, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 613 days.

(21) Appl. No.: 17/990,611

(22) Filed: Nov. 18, 2022

(65) Prior Publication Data

US 2023/0164085 A1 May 25, 2023

Related U.S. Application Data

(60) Provisional application No. 63/282,592, filed on Nov. 23, 2021.

(51) Int. Cl.
*H04L 47/283* (2022.01)
*H04W 28/12* (2009.01)

(52) U.S. Cl.
CPC .......... *H04L 47/283* (2013.01); *H04W 28/12* (2013.01)

(58) Field of Classification Search
CPC ..... H04L 47/283; H04L 1/1825; H04L 47/28; H04L 65/1016; H04L 65/403;
(Continued)

(56) References Cited

U.S. PATENT DOCUMENTS

2011/0176492 A1* 7/2011 Sung .................. H04L 49/9094 370/328
2016/0219458 A1* 7/2016 Kubota ................ H04W 28/06
(Continued)

FOREIGN PATENT DOCUMENTS

CN 103457707 A 12/2013

OTHER PUBLICATIONS

Pandey et al "Efficient reordering-reassembly PDCP and RLC window management algorithm in 5G and beyond," 2020 IEEE International Conference on Electronics, Computing and Communication Technologies (CONECCT), Bangalore, India, 2020, pp. 1-6 (Year: 2020).*

(Continued)

*Primary Examiner* — Sun Jong Kim
(74) *Attorney, Agent, or Firm* — Harrity & Harrity LLP

(57) ABSTRACT

In a wireless communications system, a user equipment (UE) may generate at least one modified timing value corresponding to at least one modem timer by modifying at least one configured timing value corresponding to the at least one modem timer based at least in part on a jitter timing value associated with an application that is instantiated on the UE. The UE may receive at least one data packet based at least in part on the at least one modified timing value.

30 Claims, 7 Drawing Sheets

(58) Field of Classification Search
CPC ........ H04L 65/65; H04L 65/80; H04W 28/12; H04W 28/0236; H04W 56/0015; H04J 3/0632; H04J 3/0697
See application file for complete search history.

(56) References Cited

U.S. PATENT DOCUMENTS

| | | | | |
|---|---|---|---|---|
| 2017/0279565 | A1* | 9/2017 | Han | H04L 1/1877 |
| 2018/0338264 | A1* | 11/2018 | Kim | H04L 69/163 |
| 2021/0258409 | A1 | 8/2021 | Kanamarlapudi et al. | |
| 2021/0314270 | A1 | 10/2021 | Dalmiya et al. | |
| 2022/0015107 | A1* | 1/2022 | Li | H04W 4/40 |
| 2023/0073796 | A1* | 3/2023 | Du | H04L 69/161 |

OTHER PUBLICATIONS

International Search Report and Written Opinion—PCT/US2022/080239—ISA/EPO—Mar. 20, 2023.

Pandey S., et al., "Efficient Reordering-Reassembly PDCP and RLC Window Management Algorithm in SG and Beyond", 2020 IEEE International Conference on Electronics, Computing and Communication Technologies (CONECCT), Jul. 2, 2020, XP033827987, 6 pages, abstract p. 1, col. 2 p. 2, col. 1-p. 4, col. 1 figure 1.

European Search Report—EP26151285—Search Authority—The Hague—Apr. 9, 2026.

* cited by examiner

MODIFYING MODEM TIMERS BASED ON JITTER TIMING ASSOCIATED WITH AN APPLICATION

CROSS-REFERENCE TO RELATED APPLICATION

This patent application claims priority to U.S. Provisional Patent Application No. 63/282,592, filed on Nov. 23, 2021, entitled "MODIFYING MODEM TIMERS BASED ON JITTER TIMING ASSOCIATED WITH AN APPLICATION," and assigned to the assignee hereof. The disclosure of the prior application is considered part of and is incorporated by reference into this patent application.

FIELD OF THE DISCLOSURE

Aspects of the present disclosure generally relate to wireless communication and specifically, to techniques and apparatuses for modifying modem timers based on jitter timing associated with an application.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipment (UEs) to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In a communication system, the end-to-end delay of a data packet may be defined as the time from its generation at the source to when the data packet reaches its destination. In a packet-switched communication system, the delay for data packets to travel from source to destination may vary depending upon various operating conditions, including, but not limited to, channel conditions and network loading. Channel conditions refer to the quality of the wireless link (for example, signal strength, speed of a UE, or physical obstructions). The end-to-end delay includes the delays introduced in the network and the various elements through which the data packet passes. Many factors contribute to end-to-end delay. Variance in the end-to-end delay is referred to as jitter. Jitter may cause data packets to be received after the data packets are no longer useful. For example, in a low latency application, such as a voice application, if a data packet is received too late, it may be dropped by the receiver, resulting in degradation of the quality of communication.

Different applications like games, extended reality applications, augmented reality applications, or virtual reality applications, among other examples, can have different jitter buffer requirements and processing requirements based on the software or hardware interconnect entities involved or processing in external hardware or software blocks with different schedulers.

Jitter management and modem timers such as a reassembly timer and a reordering timer are often independently configured by the network, which may lead to delayed real-time transport protocol packet delivery to an internet protocol (IP) multimedia subsystem (IMS) application. Though quality of service mechanisms are outlined in some wireless communication standards to facilitate coordinated configuration, radio level radio link control (RLC) protocol and radio packet data convergence protocol configuration (at a network node) is configured to achieve average latency requirements rather than peak latency requirements that can be associated with the IMS application. Additionally, the physical layer radio conditions and location of the UE can cause challenges with ensuring successful transmission and reception at the physical layer level. If modem timers are configured such that data packet delivery from the modem to the IMS application causes enough delay to overshoot the jitter buffer timing, underflow can result, causing a poor user experience, even when the modem attempts to successfully recover the data packets with proactive retransmissions or duplications at medium access control levels and RLC levels.

SUMMARY

Some aspects described herein relate to a user equipment (UE) for wireless communication. The UE may include at least one processor and at least one memory, communicatively coupled with the at least one processor, that stores processor-readable code. The processor-readable code, when executed by the at least one processor, may be configured to cause the UE to generate at least one modified timing value corresponding to at least one modem timer by modifying at least one configured timing value corresponding to the at least one modem timer based at least in part on a jitter timing value associated with an application that is instantiated on the UE. The processor-readable code, when executed by the at least one processor, may be configured to cause the UE to receive at least one data packet based at least in part on the at least one modified timing value.

Some aspects described herein relate to a method of wireless communication performed by a UE. The method may include generating at least one modified timing value corresponding to at least one modem timer by modifying at least one configured timing value corresponding to the at least one modem timer based at least in part on a jitter timing value associated with an application that is instantiated on the UE. The method may include receiving at least one data packet based at least in part on the at least one modified timing value.

Some aspects described herein relate to a non-transitory computer-readable medium that stores a set of instructions for wireless communication by a UE. The set of instructions, when executed by one or more processors of the UE, may cause the UE to generate at least one modified timing value corresponding to at least one modem timer by modifying at least one configured timing value corresponding to the at least one modem timer based at least in part on a jitter timing value associated with an application that is instantiated on the UE. The set of instructions, when executed by one or more processors of the UE, may cause the UE to receive at least one data packet based at least in part on the at least one modified timing value.

Some aspects described herein relate to an apparatus for wireless communication. The apparatus may include means for generating at least one modified timing value corresponding to at least one modem timer by modifying at least one configured timing value corresponding to the at least one modem timer based at least in part on a jitter timing value associated with an application that is instantiated on the apparatus. The apparatus may include means for receiving at least one data packet based at least in part on the at least one modified timing value.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to delivering data packets with a timing to achieve a balance between delivering data packets in time and delivering data packets with minimal loss. Some aspects more specifically relate to modifying configured modem timers based at least in part on jitter timing values associated with applications. In some aspects, a user equipment (UE) may generate at least one modified timing value corresponding to at least one modem timer by modifying at least one configured timing value corresponding to the at least one modem timer based at least in part on a jitter timing value associated with an application that is instantiated on the UE. In some aspects, the UE may receive at least one data packet based at least in part on the at least one modified timing value.

Particular aspects of the subject matter described in this disclosure can be implemented to realize one or more of the following potential advantages. In some examples, the described techniques can be used to reduce underflow of jitter buffers, thereby resulting in fewer lost data packets and, as a result, a positive impact on user experience.

Figure 1:
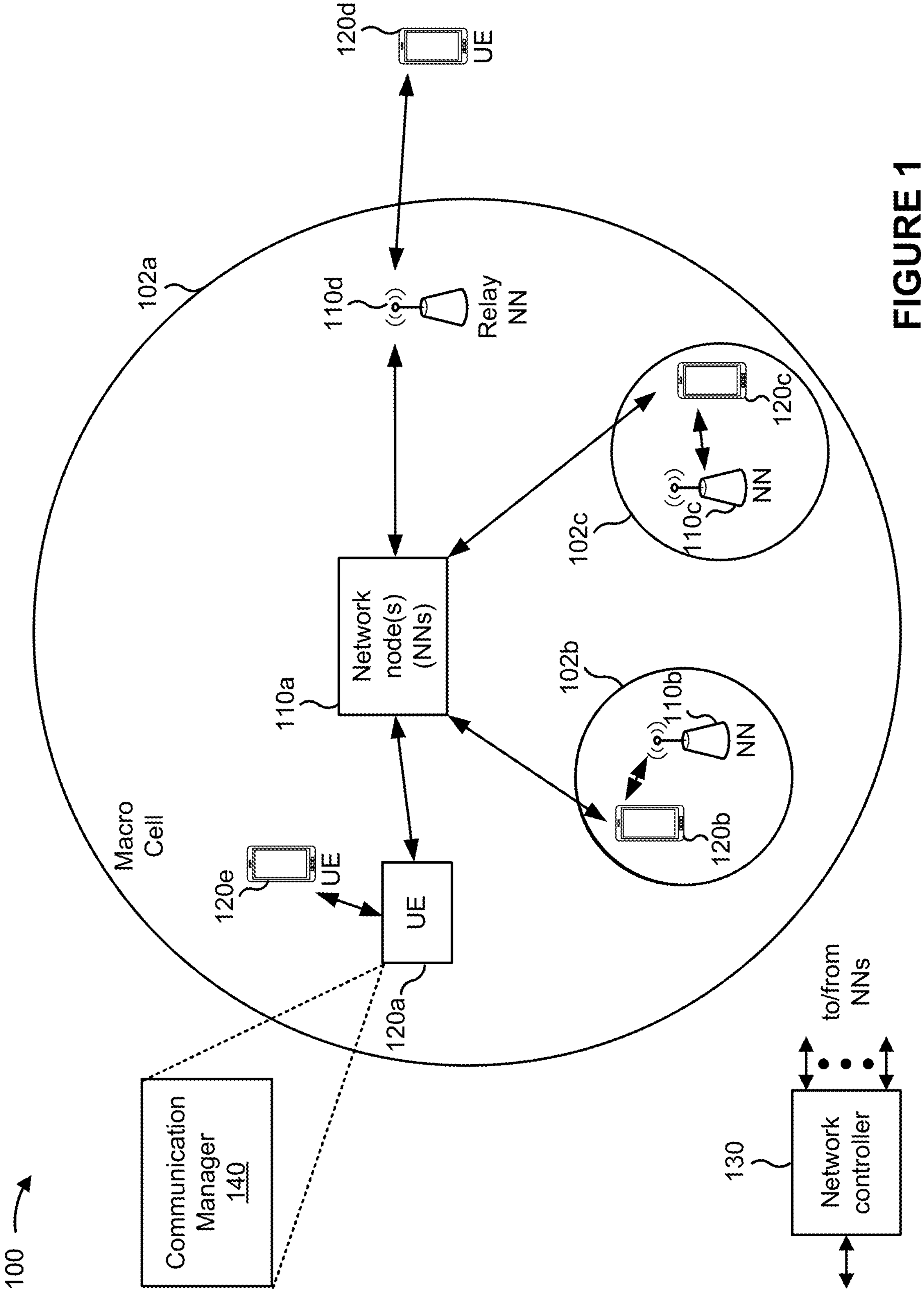
FIG. 1 is a diagram illustrating an example of a wireless network in accordance with the present disclosure.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), or other network entities. A network node 110 is an entity that communicates with UEs 120. A network node 110 may include, for example, a base station, an NR network node, an LTE network node, a Node B, an eNB (for example, in 4G), a gNB (for example, in 5G), an access point, or a transmission reception point (TRP), a distributed unit (DU), a radio unit (RU), a central unit (CU), a mobility element of a network, a core network node, a network element, a network equipment, and/or a radio access network (RAN) node.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells.

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may generate at least one modified timing value corresponding to at least one modem timer by modifying at least one configured timing value corresponding to the at least one modem timer based at least in part on a jitter timing value associated with an application that is instantiated on the UE; and receive at least one data packet based at least in part on the at least one modified timing value. Additionally or alternatively, the communication manager 140 may perform one or more other operations described herein.

Figure 2:
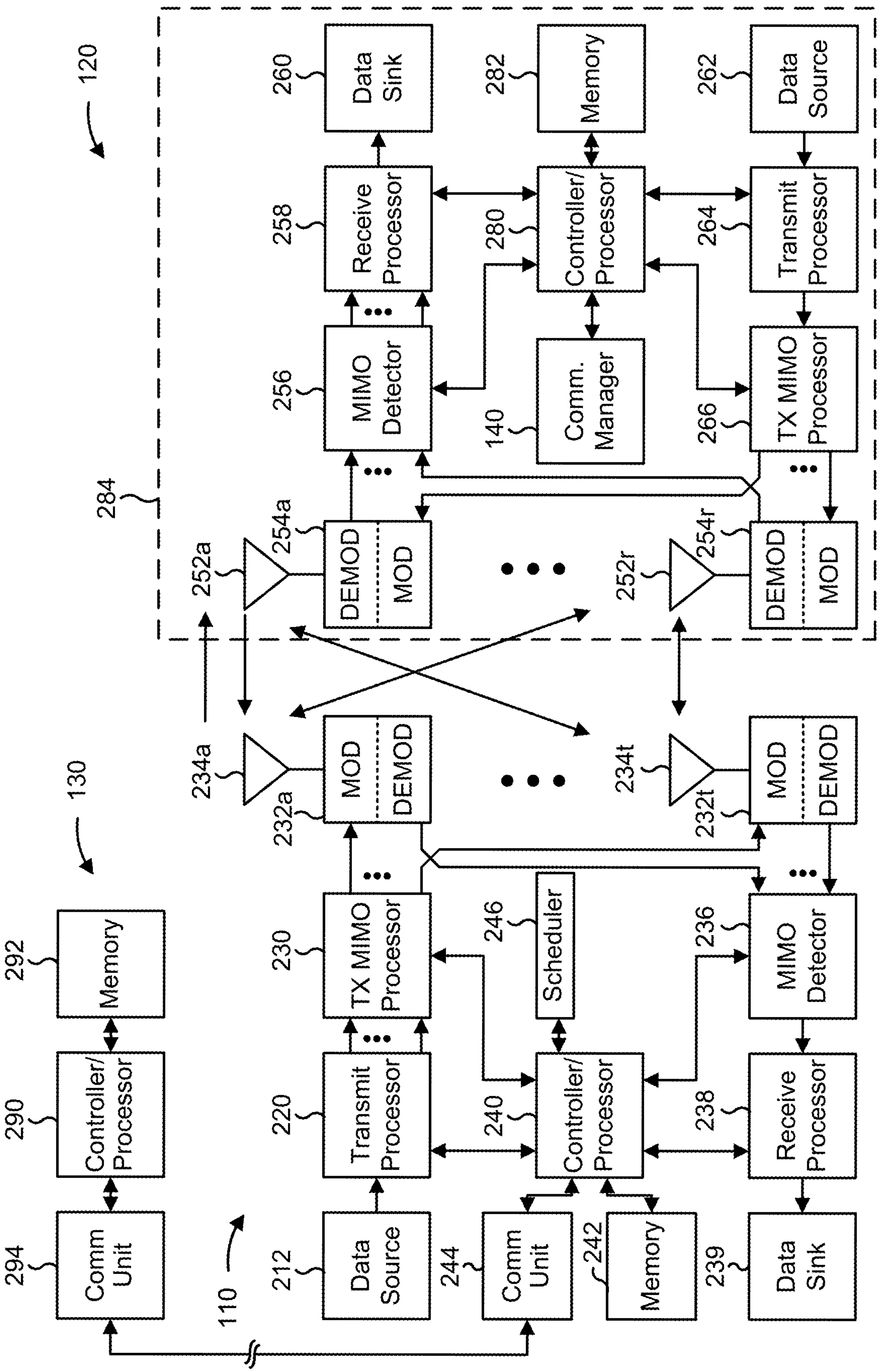
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term “controller/processor” may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with modifying modem timers based on jitter timing associated with an application, as described in more detail elsewhere herein. For example, the controller/processor 240 of the network node 110, the controller/processor 280 of the UE 120, or any other component(s) of FIG. 2 may perform or direct operations of, for example, process 600 of FIG. 6. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 600 of FIG. 6. In some examples, executing instructions may include running the instructions, converting the instructions, compiling the instructions, or interpreting the instructions, among other examples.

In some aspects, the UE includes means for generating at least one modified timing value corresponding to at least one modem timer by modifying at least one configured timing value corresponding to the at least one modem timer based at least in part on a jitter timing value associated with an application that is instantiated on the UE; or means for receiving at least one data packet based at least in part on the at least one modified timing value. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 3:
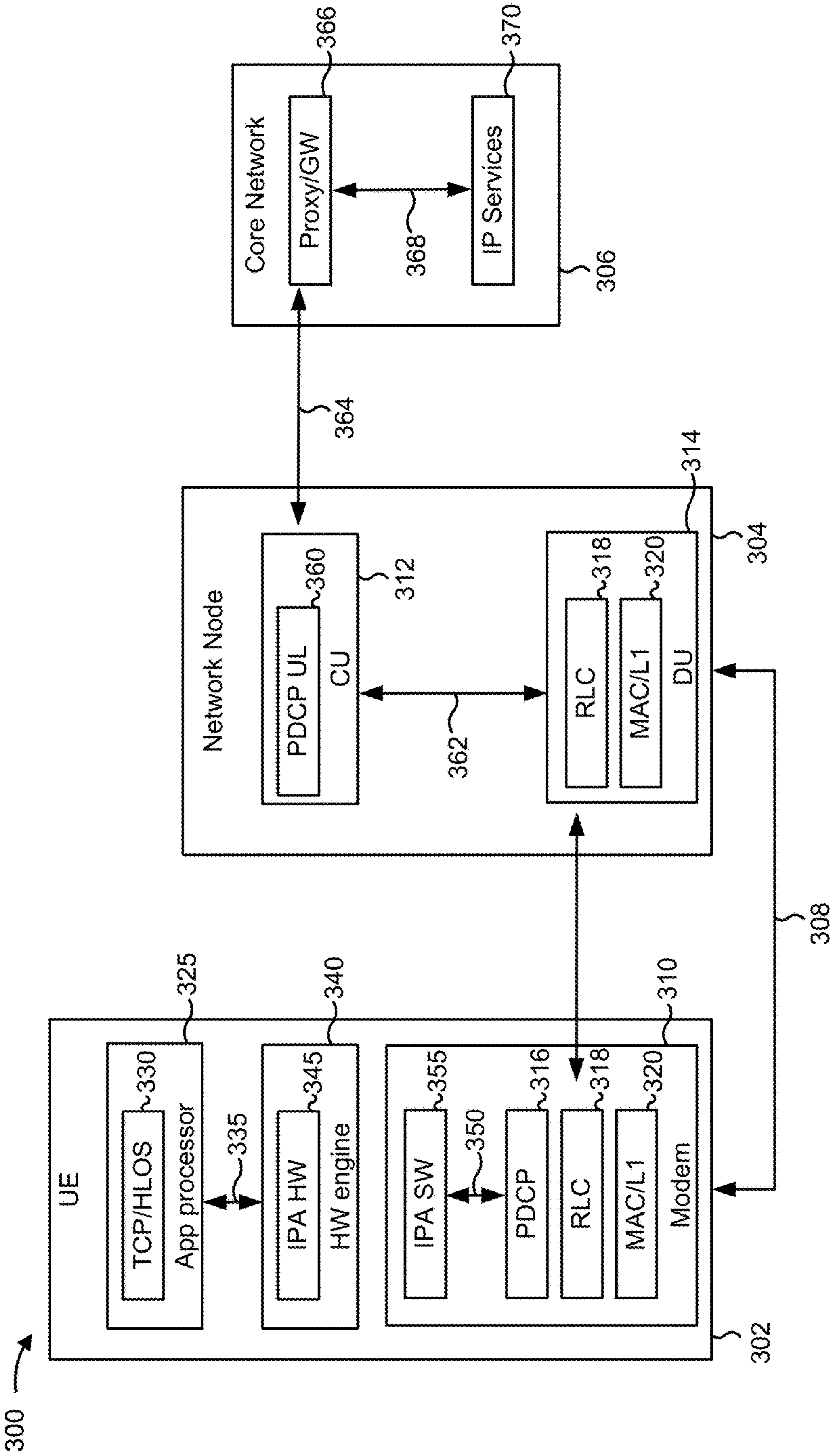
FIG. 3 is a diagram illustrating an example of a wireless communication network in accordance with the present disclosure.

FIG. 3 is a diagram illustrating an example of a wireless communication network 300, in accordance with the present disclosure. As shown, the wireless communication network 300 includes a UE 302 and a network node 304 that communicate with one another. Additionally, the network node 304 can communicate with a core network 306.

The network node 304 can transmit, via an over-the-air (OTA) interface 308, a data packet to the UE 302 in a downlink transmission, and the UE 302 can transmit a data packet, via the OTA interface 308, to the network node 304 in an uplink transmission. The UE 302 can receive and transmit data packets using a component such as a modem 310. The network node 304 can include a central unit (CU) 312 or one or more distributed units (DUs) (for example, one or more TRPs) 314. The DU 314 can host one or more TRPs and can, for example, be located at edges of the network 300 with radio frequency (RF) functionality.

As used herein, the term "data packet" refers to a unit of data for transmission between a transmitting device and a receiving device. For example, "data packet" can refer to a packet of data according to a particular communications protocol, such as an internet protocol (IP) packet or a transmission control protocol (TCP) packet. In some examples, "data packet" can refer to a data unit of a communications protocol stack (for example, a unit of data transferred between one protocol layer and another protocol layer), such as a protocol data unit (PDU) or a service data unit (SDU) of a particular protocol layer. A data packet can be transmitted over a communications medium, including, for example, one or more modulated signals such as OFDM symbols carried by one or more carrier frequencies or subcarrier frequencies of a radio frequency spectrum band.

The wireless communication network 300 operates according to a layered protocol stack. The modem 310 can implement one or more portions of the layered protocol stack. In a user plane, communications at the bearer or packet data convergence protocol (PDCP) layer 316 can be IP-based. The PDCP layer 316 may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (for example, in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

A radio link control (RLC) layer 318 can perform data packet segmentation and reassembly to communicate over logical channels. A set 320 of lower level layers can include a medium access control (MAC) layer and a physical layer (which may be referred to as a physical layer or Layer 1, shown as "L1"). The MAC layer can perform priority handling and multiplexing of logical channels into transport channels. The MAC layer can also use error detection techniques, error correction techniques, or both to support retransmissions at the MAC layer to improve link efficiency. At the physical layer, transport channels can be mapped to physical channels.

A radio resource control (RRC) layer (not shown) can provide establishment, configuration, and maintenance of an RRC connection between the UE and a network node or a core network. The RRC layer can determine a modem configuration and provide details of the modem configuration to the modem 310. For example, network node 304 can transmit an RRC message containing the modem configuration. In some cases, a modem configuration can include a timer configuration that configures one or more modem timers. The modem configuration can include any number of additional configuration parameters.

On the uplink, the PDCP layer can map radio bearers to RLC channels. The PDCP layer can handle various services and functions on the user plane, including sequence numbering, header compression and decompression (if robust header compression is enabled), transfer of user data, reordering and duplicate detection (if in-order delivery to layers above the PDCP layer is required), PDCP PDU routing (in case of split bearers), retransmission of PDCP SDUs, ciphering and deciphering, PDCP SDU discard (for example, in accordance with a timer, as described elsewhere herein), PDCP re-establishment and data recovery for RLC AM, and duplication of PDCP PDUs. The PDCP layer can handle similar services and functions on the control plane, including sequence numbering, ciphering, deciphering, integrity protection, transfer of control plane data, duplicate detection, and duplication of PDCP PDUs. An SDU is a data packet received by a layer and a PDU is a data packet output of a layer.

The PDCP layer can provide data, in the form of PDCP PDUs, to the RLC layer via RLC channels. The RLC layer can handle transfer of upper layer PDUs to the MAC or physical layers, sequence numbering independent of PDCP sequence numbering, error correction via automatic repeat requests (ARQs), segmentation and re-segmentation, reassembly of an SDU, RLC SDU discard, and RLC re-establishment.

The RLC layer can provide data, mapped to logical channels, to the MAC layer. The services and functions of the MAC layer include mapping between logical channels and transport channels (used by the physical layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARD), priority handling between UEs by means of dynamic scheduling, priority handling between logical channels of one UE by means of logical channel prioritization, and padding.

The RLC protocol may include functions such as reordering data packet data, segmentation of data, or reassembly of data, among other examples. The PDCP may include functions such as transferring data to upper layers, integrity protection, ciphering data, or deciphering data, among other examples. RLC protocol or PDCP may be required to transmit data packets in order to the application processor 325. In some cases, the modem 310 may perform reordering at either the RLC layer 318 or PDCP layer 316 before sending data to upper layers and eventually to the application processor or to a tethered endpoint. For reordering, the UE 302 can store out of order received data packets until the in order sequence is determined. Reassembly of sequences of data packets can be performed within a reassembly timing value that is tracked by a reassembly timer.

The MAC layer can package data from logical channels into TBs, and can provide the TBs on one or more transport channels to the physical layer. The physical layer can handle various operations relating to transmission of a data signal, as described in more detail in connection with FIG. 2.

On the downlink, the operations may be similar to those described for the uplink, but reversed. For example, the physical layer can receive TBs and can provide the TBs on one or more transport channels to the MAC layer. The MAC layer can map the transport channels to logical channels and can provide data to the RLC layer via the logical channels. The RLC layer can map the logical channels to RLC channels and can provide data to the PDCP layer via the RLC channels. The PDCP layer can map the RLC channels to radio bearers and can provide data to the RRC/NAS layer via the radio bearers.

Data can be passed between the layers in the form of PDUs and SDUs. An SDU is a unit of data that has been passed from a layer or sublayer to a lower layer. For example, the PDCP layer can receive a PDCP SDU. A given layer can then encapsulate the unit of data into a PDU and can pass the PDU to a lower layer. For example, the PDCP layer can encapsulate the PDCP SDU into a PDCP PDU and can pass the PDCP PDU to the RLC layer. The RLC layer can receive the PDCP PDU as an RLC SDU, can encapsulate the RLC SDU into an RLC PDU, and so on. In effect, the PDU carries the SDU as a payload.

Generally, a first layer is referred to as higher than a second layer if the first layer is further from the physical layer than the second layer. For example, the physical layer may be referred to as a lowest layer, and the PDCP/RLC/MAC layer may be referred to as higher than the physical layer and lower than the RRC layer. An application (APP) layer, not shown in FIG. 3, may be higher than the PDCP/RLC/MAC layer. In some cases, an entity may handle the services and functions of a given layer (for example, a PDCP entity may handle the services and functions of the PDCP layer), though the description herein refers to the layers themselves as handling the services and functions.

In some examples, the UE 302 may include an application processor 325 that can instantiate, for example, one or more applications that consume or generate data packets that are communicated between the UE 302 and the network node 304. The AP 325 can implement a set 330 of upper layers associated with one or more upper layer protocols such as, for example, TCP or a high level operating system (HLOS) protocol, among other examples. The AP 325 can communicate, via a serial interface 335, with a hardware acceleration engine 340 that can, for example, include an IP acceleration (IPA) hardware module 345. The serial interface 335 can include, for example, a peripheral component interconnect express (PCIe) link or an inter-integrated circuit sound bus (I2S), among other examples. A similar serial interface 350 (for example, a PCIe link) can provide an interface between the PDCP layer 316 and an IPA software module 355.

As shown, the DU 314 can implement the set 320 of lower level layers to facilitate transmitting and receiving data packets via the OTA interface 308. The DU 314 also can implement the RLC layer 318, which can facilitate RLC communication with the UE 302. The CU 312 can implement an uplink PDCP module 360 that can communicate with the DU via an interface 362, such as, for example, an F1-U interface or an NR-U interface, among other examples. Additionally, as shown, the CU 312 can communicate, via an S1U or NG-U interface 364 with the core network 306. For example, the CU 312 can communicate with a proxy or gateway (shown as "Proxy/GW") 366 hosted by the core network 306. The proxy or gateway 366 can communicate, via an S1U interface 368, with IP services 370.

The core network 306 can provide user authentication, access authorization, tracking, IP connectivity, and other access, routing, or mobility functions. The core network 306 can be an evolved packet core (EPC) or 5G core (5GC), which can include at least one control plane entity that manages access and mobility (for example, a mobility management entity (MME), an access and mobility management function (AMF)) and at least one user plane entity that routes data packets or interconnects to external networks (for example, the proxy or gateway 366, which can include a serving gateway (S-GW), a packet data network (PDN) gateway (P-GW), or a user plane function (UPF)). The control plane entity can manage non-access stratum (NAS) functions such as mobility, authentication, and bearer management for the UEs served by the network node s associated with the core network 306. User IP data packets can be transferred through the user plane entity, which can provide IP address allocation as well as other functions. The user plane entity can be connected to the network operator's IP services 370. The network operator's IP services 366 can include access to the Internet, intranet(s), an IP multimedia subsystem (IMS), or a packet-switched streaming service.

Figure 4:
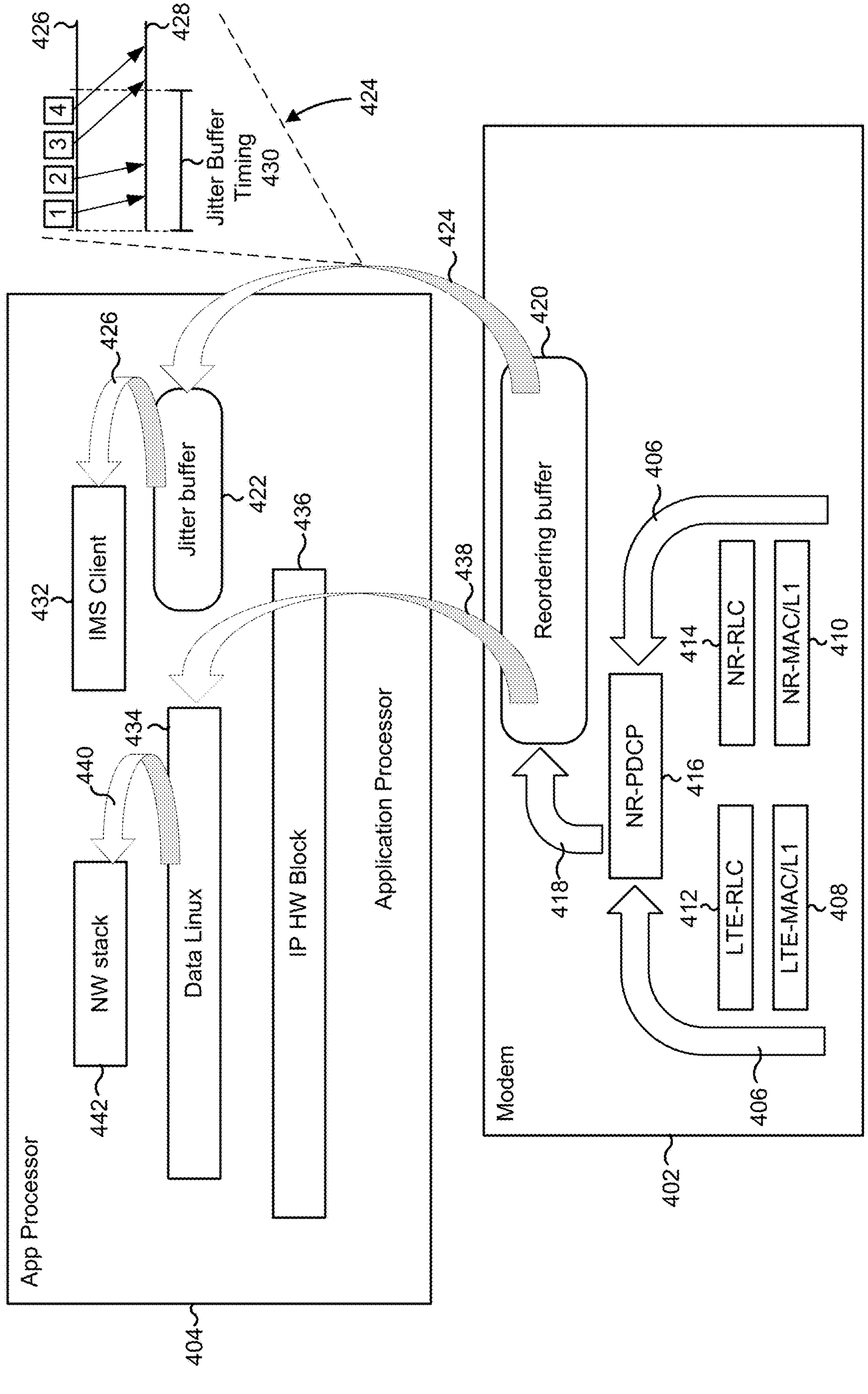
FIG. 4 is a diagram illustrating an example of a UE configured to receive downlink data packets in accordance with the present disclosure.

FIG. 4 is a diagram illustrating an example of a UE 400 configured to receive downlink data packets, in accordance with the present disclosure. As shown, the UE 400 includes a modem 402 and an application processor 404 (shown as "app processor"). In a first operation 406, data packets can be processed at the modem (for example, via a transceiver that receives the data packets from an OTA transmission). The data packets can follow either an LTE processing path or an NR processing path through an LTE MAC layer and LTE physical layer 408 or an NR MAC layer and NR physical layer 410 (shown as "LTE-MAC/L1" and "NR-MAC/L1" respectively) and an LTE-RLC layer 412 or an NR-RLC layer 414. The data packets from both the LTE and NR processing paths can be processed by an NR-PDCP layer 416, which generates PDCP SDUs.

In a second operation 418, the NR-PDCP layer 416 can provide the data packets to a reordering buffer 420. The NR-PDCP layer 416 can manage reordering and discarding of PDCP SDUs that are provided from the respective MAC layers of the LTE-MAC/L1 408 and the NR-MAC/L1 410. Each PDCP SDU can have a corresponding PDCP sequence number (SN) that can be used to reorder PDCP SDUs in consecutive order according to their associated SNs. The NR-PDCP layer 416 can perform reordering by establishing a reordering window that defines a range of PDCP SNs that are eligible for reordering. The length of the reordering window can be referred to as a "reordering timing value." If a PDCP PDU is received from a MAC layer of the LTE-MAC/L1 408 or the NR-MAC/L1 410 that contains SDUs with PDCP SNs outside of the reordering window, the respective NR-PDCP layer 416 can discard the PDU. The NR-PDCP layer 416 can then process non-discarded PDUs and store associated SDUs in a reordering buffer 420. The NR-PDCP layer 416 can associate a count value with the SDU that is a concatenation of a hyperframe number (HFN) and PDCP SN (for example, having a 32 bit value), and perform deciphering of the SDU. The NR-PDCP layer 416 can discard SDUs that are duplicated. The NR-PDCP layer 416 can deliver the resultant SDUs to respective upper layers in sequential order according to their associated PDCP SNs. In the event that one or more PDCP SDUs are in the reordering buffer 420 that are not in sequential order, a reordering timer may be initiated.

In a wireless communication system, each data packet may incur a source to destination delay different from that experienced by other data packets belonging to the same flow. This variation in delay is known as "jitter." Jitter creates additional complications for receiver-side applications. If the receiver (for example, the UE 400) does not correct for jitter, the received message will suffer distortion when the data packets are re-assembled. The UE 400 can correct for jitter when reconstructing messages from the received data packets. As shown, the application processor 404 (or another component of the UE 400) can include a jitter buffer 422, which adds a wait time, referred to as a jitter buffer delay or jitter buffer timing.

Data packets arriving at the jitter buffer 422 can arrive at irregular intervals. One of the design goals of a jitter buffer, therefore, is to adjust for the irregularity of incoming data. As shown in a third operation 424, data packets are provided from the reordering buffer 420 to the jitter buffer 422, and a condition referred to as "underflow" can occur. Underflow at the jitter buffer 422 can occur when there are missing data packets. A data packet can be missing when it is lost or delayed. A lost data packet causes an underflow when dropped before it reaches the UE 400, such as when it is dropped somewhere in the access network, for example on the physical layer or the forward link scheduler.

Alternatively, an underflow can occur as a result of a data packet that is delayed and arrives after its playback time. For example, as shown, in the third operation 424, a set of four data packets (labeled "1," "2," "3," and "4") transmitted from a network node (represented by time-domain line 426) to the UE (represented by time-domain line 428) can arrive as indicated by the arrows. Data packets 1 and 2 are received within a jitter buffer timing 430. Data packet 3 arrives after the jitter buffer timing 430 and, as a result, is discarded. If data packet 4 is received within a next jitter buffer timing (not shown), for example, data packets 1, 2 and 4 can be provided to an IMS client 432, while data packet 3 is missing, resulting in underflow. Underflow can result in missed content, inaccurate data, dropped calls, or application errors. The jitter buffer 422 can be used for IMS content such as, for example, voice frames or video frames, among other examples.

As shown, the reordering buffer can deliver other data packets such as, for example, TCP data PDUs to a data Linux module 434 via an IP hardware block 436 in a fourth operation 438. In a fifth operation 440, the data Linux module 434 can deliver the data packets from the data Linux module 434 to a network protocol stack 442 (shown as "NW stack").

When a reordering timer is configured to a much higher value than a reassembly timer for an IMS bearer, this can lead to unnecessary holding of data packets at the NR-PDCP 416. As a result, the NR-PDCP 416 can deliver data packets to the jitter buffer 422 with a delay of more than a configured jitter buffer timing value. Because IMS traffic is prone to data packet loss and, as there is no retransmission at the RLC level, there is no value in holding a data packet beyond a reassembly timer expiry in a non-dual connectivity use case. Different applications like games, extended reality applications, augmented reality applications, or virtual reality applications, among other examples, can have different jitter buffer requirements and processing requirements based on the software or hardware interconnect entities involved or processing in external hardware or software blocks with different schedulers.

Jitter management and modem timers such as the reassembly timer and the reordering timer are often independently configured by the network, which may lead to delayed real-time transport protocol (RTP) packet delivery to the IMS application. Though quality of service (QoS) mechanisms are outlined in some wireless communication standards to facilitate coordinated configuration, radio level RLC/PDCP configuration (at the network node) is configured to achieve average latency requirements rather than peak latency requirements that can be associated with the IMS application. Additionally, the physical layer radio conditions and location of the UE can cause challenges with ensuring successful transmission and reception at the physical layer level. If modem timers are configured such that data packet delivery from the modem to the IMS application causes enough delay to overshoot the jitter buffer timing, underflow can result, causing a poor user experience, even when the modem attempts to successfully recover the data packets with proactive retransmissions or duplications at MAC/RLC levels.

Various aspects relate generally to delivering data packets with a timing to achieve a balance between delivering data packets in time and delivering data packets with minimal loss. Some aspects more specifically relate to modifying configured modem timers based at least in part on jitter timing values associated with applications. In some aspects, a UE may generate at least one modified timing value corresponding to at least one modem timer by modifying at least one configured timing value corresponding to the at least one modem timer based at least in part on a jitter timing value associated with an application that is instantiated on the UE. In some aspects, the UE may receive at least one data packet based at least in part on the at least one modified timing value.

Particular aspects of the subject matter described in this disclosure can be implemented to realize one or more of the following potential advantages. In some examples, the described techniques can be used to reduce underflow of jitter buffers, thereby resulting in fewer lost data packets and, as a result, a positive impact on user experience.

Figure 5:
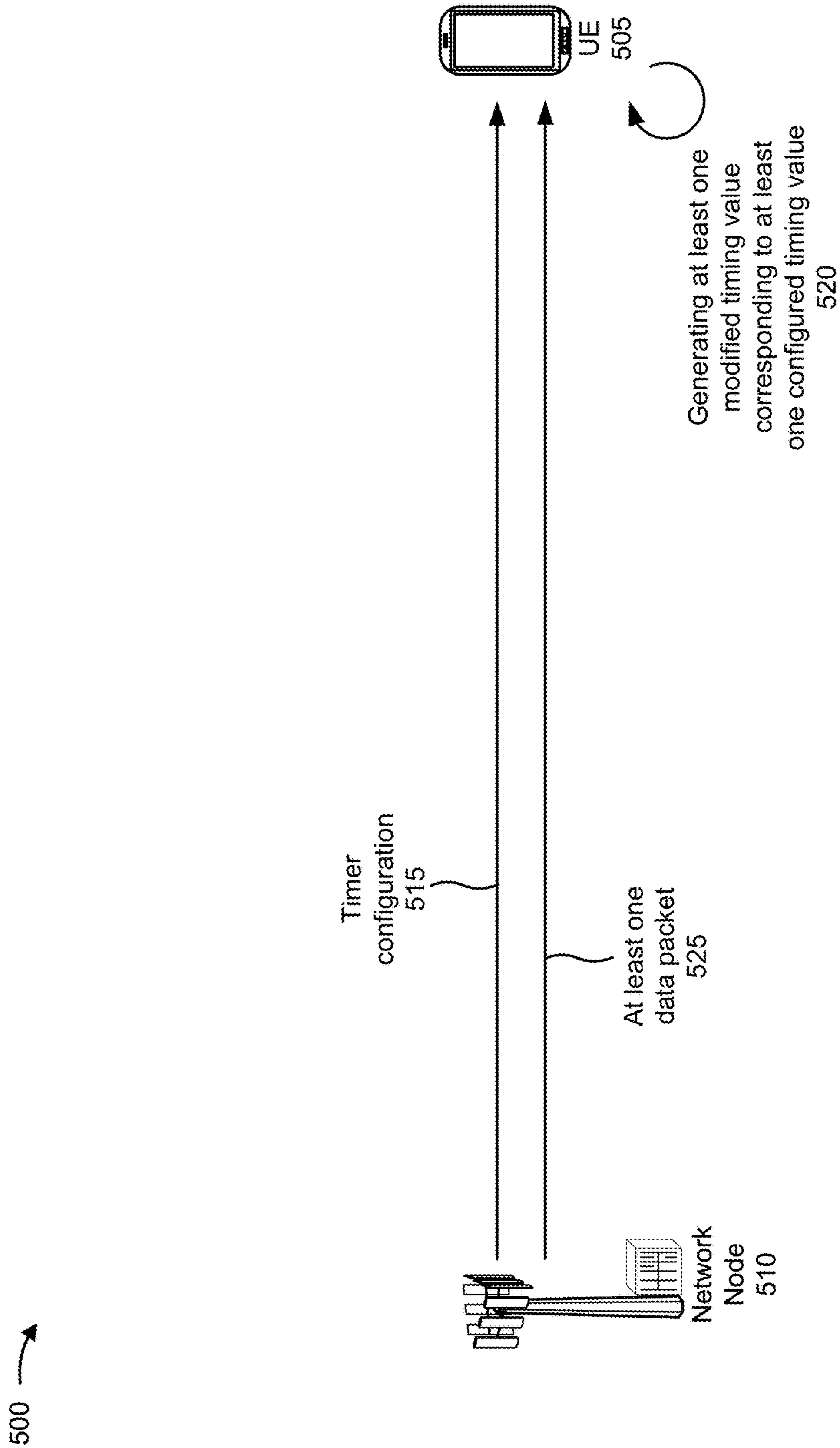
FIG. 5 is a diagram illustrating an example associated with modifying modem timers based on jitter timing associated with an application in accordance with the present disclosure.

FIG. 5 is a diagram illustrating an example 500 associated with modifying modem timers based on jitter timing associated with an application, in accordance with the present disclosure. As shown in FIG. 5, a UE 505 and a network node 510 may communicate with one another. In some aspects, the UE 505 may be, or be similar to, the UE 400 depicted in FIG. 4, the UE 302 depicted in FIG. 3, or the UE 120 depicted in FIGS. 1 and 2. In some aspects, the network node 510 may be, or be similar to, the network node 304 depicted in FIG. 3 or the network node 110 depicted in FIGS. 1 and 2.

In a first operation 515, the network node 510 may transmit, and the UE 505 may receive, a timer configuration. The timer configuration may indicate at least one configured timing value. The at least one configured timing value may be a configured timing value of a modem timer such as, for example, a reordering timer or a reassembly timer.

In a second operation 520, the UE 505 may generate at least one modified timing value corresponding to at least one modem timer by modifying at least one configured timing value corresponding to the at least one modem timer based at least in part on a jitter timing value associated with an application that is instantiated on the UE 505. In some aspects, the at least one modem timer may include a reordering timer and a reassembly timer. The application may be associated with an IMS. In some aspects, the application may include at least one of an extended reality application, a virtual reality application, or an augmented reality application.

In some aspects, the at least one modified timing value may include a modified reordering timing value corresponding to the reordering timer and a modified reassembly timing value corresponding to the reassembly timer. The at least one modified timing value may be based at least in part on a relationship between the modified reordering timing value and the modified reassembly timing value. For example, the modified reordering timing value may be equal to a first product, TJitter*N, of the jitter timing value TJitter and a value of a first variable N. In some aspects, the value of N may be a percentage or a decimal representation of a percentage.

The value of the first variable N may be based at least in part on at least one of a location of a jitter buffer or a processing delay associated with the jitter buffer. In some aspects, the processing delay may correspond to an interface between an IPA and a direct memory access component. For example, in some aspects, the processing delay may correspond to at least one of an I2S interface, a PCIe connection, or a scheduler.

In some aspects, the first product TJitter*N may be greater than, or equal to, a sum of a second variable X and a second product M*Treassembly of the modified reassembly timing value Treassembly and a value of a third variable M. For example, the at least one modified timing value may be based at least in part on a relationship that indicates that TJitter*N %=Treorder>=M*Treassembly+X.

In some aspects, the value of the second variable X may include a retransmission timing value. In some aspects, at least one of the value of the first variable Nor the value of the second variable X may be based at least in part on at least one of: a connection type of a communication connection between the UE 505 and a network node (for example, the network node 510), or a processing parameter associated with the application. In some aspects, the third variable M may include a coefficient that is based on an RLC mode. For example, the coefficient may be equal to one (M=1) based at least in part on the RLC mode being an un-acknowledge mode (UM), or greater than or equal to one (M>1) based at least in part on the RLC mode being an acknowledge mode (AM).

In some aspects, the coefficient may be based at least in part on a number of RLC automatic repeat requests associated with the application. The modified reassembly timing value may be based at least in part on an average value of a set of hybrid automatic repeat request (HARQ) latency time values between retransmissions. In some aspects, the modified reordering timing value may be based at least in part on a sum of a processing delay value and the modified reassembly timing value. In some aspects, the processing delay value may be based at least in part on a processing architecture. The processing delay value may correspond to a processing delay between an interface unit hardware component and an interface unit software component. For example, the processing delay value may correspond to a processing delay associated with an F1-U interface between a DU and a CU.

In a third operation 525, the network node 510 may transmit, and the UE 505 may receive, at least one data packet based at least in part on the at least one modified timing value.

Figure 6:
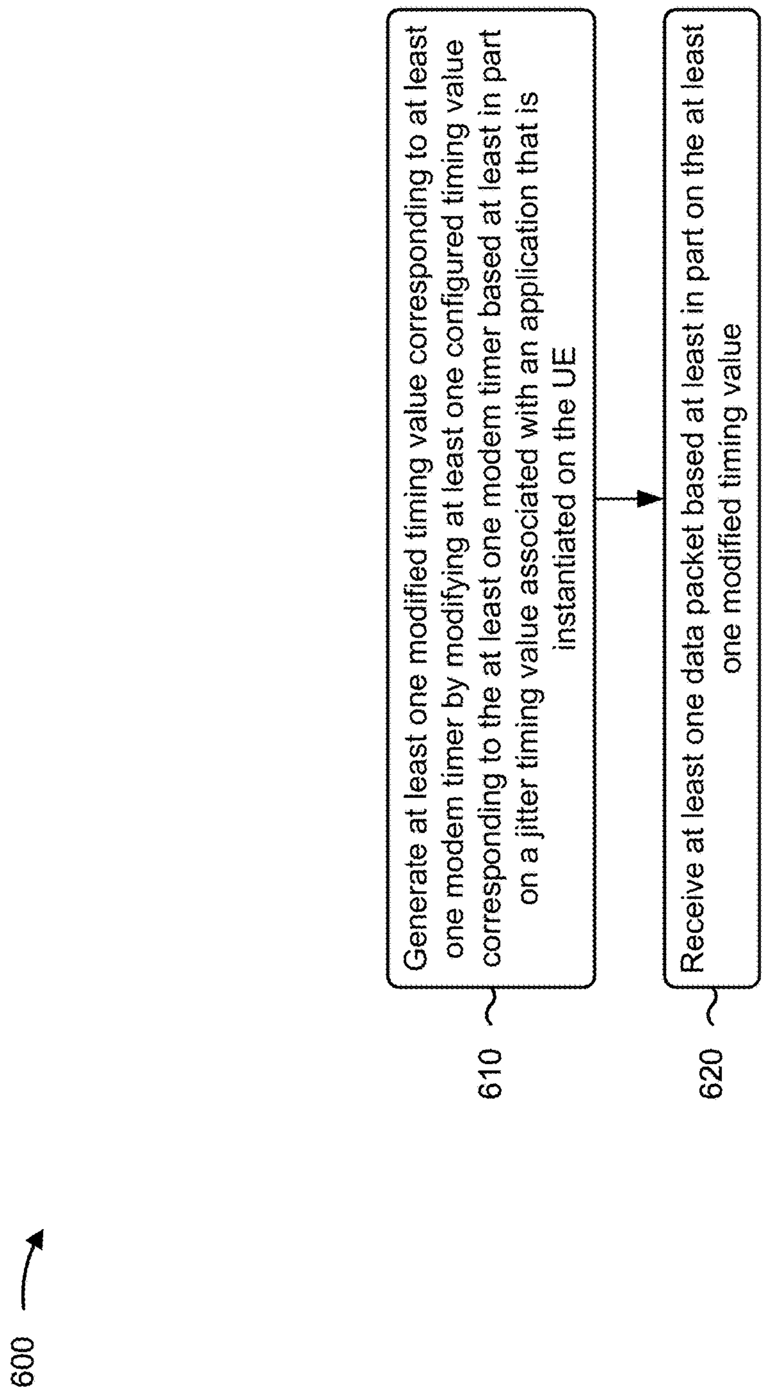
FIG. 6 is a flowchart illustrating an example process performed, for example, by a UE configured to modify modem timers based on jitter timing associated with an application in accordance with the present disclosure.

FIG. 6 is a flowchart illustrating an example process 600 performed, for example, by a UE in accordance with the present disclosure. Example process 600 is an example where the UE (for example, UE 120) performs operations associated with modifying modem timers based on jitter timing associated with an application.

As shown in FIG. 6, in some aspects, process 600 may include generating at least one modified timing value corresponding to at least one modem timer by modifying at least one configured timing value corresponding to the at least one modem timer based at least in part on a jitter timing value associated with an application that is instantiated on the UE (block 610). For example, the UE (such as by using communication manager 140 or generation component 708, depicted in FIG. 7) may generate at least one modified timing value corresponding to at least one modem timer by modifying at least one configured timing value corresponding to the at least one modem timer based at least in part on a jitter timing value associated with an application that is instantiated on the UE, as described above.

As further shown in FIG. 6, in some aspects, process 600 may include receiving at least one data packet based at least in part on the at least one modified timing value (block 620). For example, the UE (such as by using communication manager 140 or reception component 702, depicted in FIG. 7) may receive at least one data packet based at least in part on the at least one modified timing value, as described above.

Process 600 may include additional aspects, such as any single aspect or any combination of aspects described below or in connection with one or more other processes described elsewhere herein.

In a first additional aspect, process 600 includes receiving a timer configuration that indicates the at least one configured timing value.

In a second additional aspect, alone or in combination with the first aspect, the at least one modem timer comprises a reordering timer and a reassembly timer.

In a third additional aspect, alone or in combination with the second aspect, the at least one modified timing value comprises a modified reordering timing value corresponding to the reordering timer and a modified reassembly timing value corresponding to the reassembly timer, and the at least one modified timing value is further based at least in part on a relationship between the modified reordering timing value and the modified reassembly timing value.

In a fourth additional aspect, alone or in combination with the third aspect, the modified reordering timing value is equal to a first product of the jitter timing value and a value of a first variable.

In a fifth additional aspect, alone or in combination with the fourth aspect, the value of the first variable is based at least in part on at least one of a location of a jitter buffer or a processing delay associated with the jitter buffer.

In a sixth additional aspect, alone or in combination with the fifth aspect, the processing delay corresponds to an interface between an internet packet accelerator and a direct memory access component.

In a seventh additional aspect, alone or in combination with one or more of the fifth through sixth aspects, the processing delay corresponds to at least one of an inter-integrated circuit sound interface, a peripheral component interconnect express connection, or a scheduler.

In an eighth additional aspect, alone or in combination with one or more of the fourth through seventh aspects, the first product is greater than, or equal to, a sum of a second variable and a second product of the modified reassembly timing value and a value of a third variable.

In a ninth additional aspect, alone or in combination with the eighth aspect, the value of the second variable comprises a retransmission timing value.

In a tenth additional aspect, alone or in combination with one or more of the eighth through ninth aspects, at least one of the value of the first variable or the value of the second variable is based at least in part on at least one of a connection type of a communication connection between the UE and a network node, or a processing parameter associated with the application.

In an eleventh additional aspect, alone or in combination with one or more of the eighth through tenth aspects, the third variable comprises a coefficient that is based on an RLC mode.

In a twelfth additional aspect, alone or in combination with the eleventh aspect, the coefficient is equal to one, based at least in part on the RLC mode being an unacknowledge mode, or greater than or equal to one based at least in part on the RLC mode being an acknowledge mode.

In a thirteenth additional aspect, alone or in combination with one or more of the eleventh through twelfth aspects, the coefficient is based at least in part on a number of RLC automatic repeat requests associated with the application.

In a fourteenth additional aspect, alone or in combination with one or more of the eighth through thirteenth aspects, the modified reassembly timing value is based at least in part on an average value of a set of hybrid automatic repeat request latency time values between retransmissions.

In a fifteenth additional aspect, alone or in combination with one or more of the eighth through fourteenth aspects, the modified reordering timing value is based at least in part on a sum of a processing delay value and the modified reassembly timing value.

In a sixteenth additional aspect, alone or in combination with the fifteenth aspect, the processing delay value is based at least in part on a processing architecture.

In a seventeenth additional aspect, alone or in combination with one or more of the fifteenth through sixteenth aspects, the processing delay value corresponds to a processing delay between an interface unit hardware component and an interface unit software component.

In an eighteenth additional aspect, alone or in combination with one or more of the fifteenth through seventeenth aspects, the processing delay value corresponds to a processing delay associated with an F1-U interface between a distributed unit and a central unit.

In a nineteenth additional aspect, alone or in combination with one or more of the first through eighteenth aspects, the application is associated with an internet protocol multimedia subsystem.

In a twentieth additional aspect, alone or in combination with the nineteenth aspect, the application comprises at least one of an extended reality application, a virtual reality application, or an augmented reality application.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
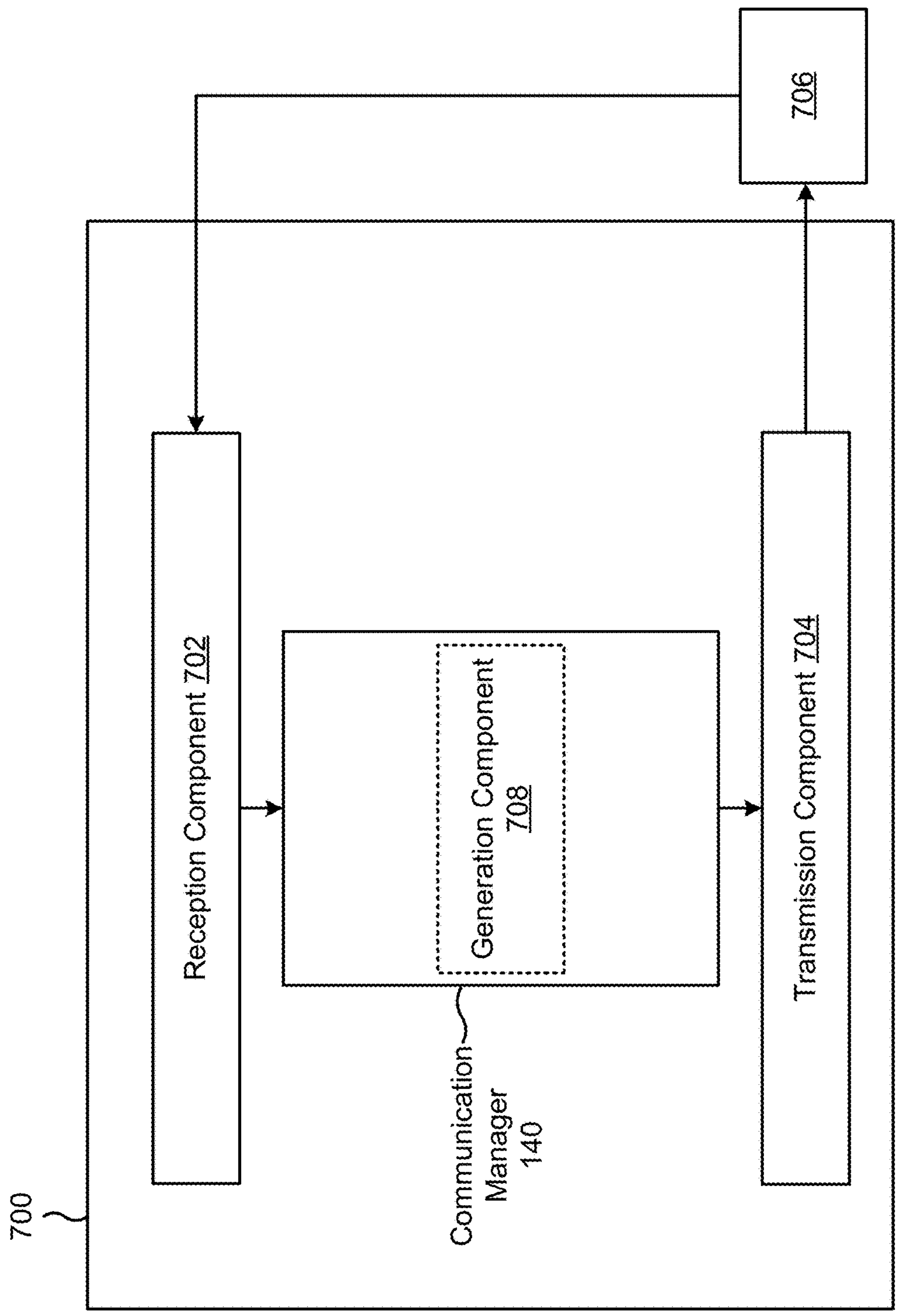
FIG. 7 is a diagram of an example apparatus for wireless communication in accordance with the present disclosure.

FIG. 7 is a diagram of an example apparatus 700 for wireless communication in accordance with the present disclosure. The apparatus 700 may be a UE, or a UE may include the apparatus 700. In some aspects, the apparatus 700 includes a reception component 702, a transmission component 704, and a communication manager 140, which may be in communication with one another (for example, via one or more buses). As shown, the apparatus 700 may communicate with another apparatus 706 (such as a UE, a network node, or another wireless communication device) using the reception component 702 and the transmission component 704.

In some aspects, the apparatus 700 may be configured to perform one or more operations described herein in connection with FIG. 5. Additionally or alternatively, the apparatus 700 may be configured to perform one or more processes described herein, such as process 600 of FIG. 6. In some aspects, the apparatus 700 may include one or more components of the UE described above in connection with FIG. 2.

The reception component 702 may receive communications, such as reference signals, control information, data communications, or a combination thereof, from the apparatus 706. The reception component 702 may provide received communications to one or more other components of the apparatus 700, such as the communication manager 140. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a modem, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, the communication manager 140 may generate communications and may transmit the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The communication manager 140 may generate at least one modified timing value corresponding to at least one modem timer by modifying at least one configured timing value corresponding to the at least one modem timer based at least in part on a jitter timing value associated with an application that is instantiated on the UE. The communication manager 140 may receive or may cause the reception component 702 to receive at least one data packet based at least in part on the at least one modified timing value. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a generation component 708. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The generation component 708 may generate at least one modified timing value corresponding to at least one modem timer by modifying at least one configured timing value corresponding to the at least one modem timer based at least in part on a jitter timing value associated with an application that is instantiated on the UE. The reception component 702 may receive at least one data packet based at least in part on the at least one modified timing value.

The reception component 702 may receive a timer configuration that indicates the at least one configured timing value.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: generating at least one modified timing value corresponding to at least one modem timer by modifying at least one configured timing value corresponding to the at least one modem timer based at least in part on a jitter timing value associated with an application that is instantiated on the UE; and receiving at least one data packet based at least in part on the at least one modified timing value.

Aspect 2: The method of Aspect 1, further comprising receiving a timer configuration that indicates the at least one configured timing value.

Aspect 3: The method of either of Aspects 1 or 2, wherein the at least one modem timer comprises a reordering timer and a reassembly timer.

Aspect 4: The method of Aspect 3, wherein the at least one modified timing value comprises a modified reordering timing value corresponding to the reordering timer and a modified reassembly timing value corresponding to the reassembly timer, and wherein the at least one modified timing value is further based at least in part on a relationship between the modified reordering timing value and the modified reassembly timing value.

Aspect 5: The method of Aspect 4, wherein the modified reordering timing value is equal to a first product of the jitter timing value and a value of a first variable.

Aspect 6: The method of Aspect 5, wherein the value of the first variable is based at least in part on at least one of a location of a jitter buffer or a processing delay associated with the jitter buffer.

Aspect 7: The method of Aspect 6, wherein the processing delay corresponds to an interface between an internet packet accelerator and a direct memory access component.

Aspect 8: The method of either of Aspects 6 or 7, wherein the processing delay corresponds to at least one of an inter-integrated circuit sound interface, a peripheral component interconnect express connection, or a scheduler.

Aspect 9: The method of any of Aspects 5-8, wherein the first product is greater than, or equal to, a sum of a second variable and a second product of the modified reassembly timing value and a value of a third variable.

Aspect 10: The method of Aspect 9, wherein the value of the second variable comprises a retransmission timing value.

Aspect 11: The method of either of Aspects 9 or 10, wherein at least one of the value of the first variable or the value of the second variable is based at least in part on at least one of: a connection type of a communication connection between the UE and a network node, or a processing parameter associated with the application.

Aspect 12: The method of any of Aspects 9-11, wherein the third variable comprises a coefficient that is based on a radio link control (RLC) mode.

Aspect 13: The method of Aspect 12, wherein the coefficient is: equal to one based at least in part on the RLC mode being an un-acknowledge mode, or greater than or equal to one based at least in part on the RLC mode being an acknowledge mode.

Aspect 14: The method of either of Aspects 12 or 13, wherein the coefficient is based at least in part on a number of RLC automatic repeat requests associated with the application.

Aspect 15: The method of any of Aspects 9-14, wherein the modified reassembly timing value is based at least in part on an average value of a set of hybrid automatic repeat request latency time values between retransmissions.

Aspect 16: The method of any of Aspects 9-15, wherein the modified reordering timing value is based at least in part on a sum of a processing delay value and the modified reassembly timing value.

Aspect 17: The method of Aspect 16, wherein the processing delay value is based at least in part on a processing architecture.

Aspect 18: The method of either of Aspects 16 or 17, wherein the processing delay value corresponds to a processing delay between an interface unit hardware component and an interface unit software component.

Aspect 19: The method of any of Aspects 16-18, wherein the processing delay value corresponds to a processing delay associated with an F1-U interface between a distributed unit and a central unit.

Aspect 20: The method of any of Aspects 1-19, wherein the application is associated with an internet protocol multimedia subsystem.

Aspect 21: The method of Aspect 20, wherein the application comprises at least one of an extended reality application, a virtual reality application, or an augmented reality application.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:

at least one memory; and at least one processor communicatively coupled with the at least one memory, the at least one processor operable to cause the UE to:

generate a plurality of modified timing values, including a modified reordering timing value corresponding to a reordering timer and a modified reassembly timing value corresponding to a reassembly timer, by modifying a plurality of configured timing values in accordance with a jitter timing value of an application that is instantiated on the UE and in accordance with whether the application is operating in a radio link control (RLC) un-acknowledge mode (UM) or an RLC acknowledge mode (AM); and receive at least one data packet in accordance with the plurality of modified timing values.

2. The UE of claim 1, wherein the at least one processor is further operable to cause the UE to receive a timer configuration that indicates the plurality of configured timing values.

3. The UE of claim 2,
wherein the plurality of modified timing values are further in accordance with a relationship between the modified reordering timing value and the modified reassembly timing value.

4. The UE of claim 3,
wherein the modified reordering timing value is equal to a first product of the jitter timing value and a value of a first variable.

5. The UE of claim 4,
wherein the value of the first variable is in accordance with at least one of a location of a jitter buffer or a processing delay associated with the jitter buffer.

6. The UE of claim 5,
wherein the processing delay corresponds to at least one of an interface between an internet packet accelerator and a direct memory access component, an inter-integrated circuit sound interface, a peripheral component interconnect express connection, or a scheduler.

7. The UE of claim 4,
wherein the first product is greater than, or equal to, a sum of a second variable and a second product of the modified reassembly timing value and a value of a third variable, and wherein the value of the second variable comprises a retransmission timing value.

8. The UE of claim 7,
wherein at least one of the value of the first variable or the value of the second variable is in accordance with at least one of:
a connection type of a communication connection between the UE and a network node, or
a processing parameter associated with the application.

9. The UE of claim 7,
wherein the third variable comprises a coefficient that is in accordance with the RLC mode.

10. The UE of claim 9,
wherein the coefficient is:
equal to one in accordance with the RLC UM or
greater than or equal to one in accordance with the RLC AM.

11. The UE of claim 9,
wherein the coefficient is in accordance with a number of RLC automatic repeat requests associated with the RLC mode associated with the application.

12. The UE of claim 7,
wherein the modified reassembly timing value is in accordance with an average value of a set of hybrid automatic repeat request latency time values between retransmissions.

13. The UE of claim 7,
wherein the modified reordering timing value is in accordance with a sum of a processing delay value and the modified reassembly timing value.

14. The UE of claim 13,
wherein the processing delay value corresponds to a processing delay associated with an F1-U interface between a distributed unit and a central unit.

15. The UE of claim 1,
wherein the application is associated with an internet protocol multimedia subsystem.

16. The UE of claim 15,
wherein the application comprises at least one of an extended reality application, a virtual reality application, or an augmented reality application.

17. A method of wireless communication performed by a user equipment (UE), comprising:
generating a plurality of modified timing values, including a modified reordering timing value corresponding to a reordering timer and a modified reassembly timing value corresponding to a reassembly timer, by modifying a plurality of configured timing values in accordance with a jitter timing value of an application that is instantiated on the UE and in accordance with whether the application is operating in a radio link control (RLC) un-acknowledge mode (UM) or an RLC acknowledge mode (AM); and
receiving at least one data packet in accordance with the plurality of modified timing values.

18. The method of claim 17,
wherein the method further comprises receiving a timer configuration that indicates the plurality of configured timing values.

19. The method of claim 18,
wherein the plurality of modified timing values are further in accordance with a relationship between the modified reordering timing value and the modified reassembly timing value.

20. The method of claim 19,
wherein the modified reordering timing value is equal to a first product of the jitter timing value and a value of a first variable.

21. The method of claim 20,
wherein the value of the first variable is in accordance with at least one of a location of a jitter buffer or a processing delay associated with the jitter buffer.

22. The method of claim 21,
wherein the processing delay corresponds to at least one of an interface between an internet packet accelerator and a direct memory access component, an inter-integrated circuit sound interface, a peripheral component interconnect express connection, or a scheduler.

23. The method of claim 20,
wherein the first product is greater than, or equal to, a sum of a second variable and a second product of the modified reassembly timing value and a value of a third variable, and wherein the value of the second variable comprises a retransmission timing value.

24. The method of claim 23,
wherein at least one of the value of the first variable or the value of the second variable is in accordance with at least one of:
a connection type of a communication connection between the UE and a network node, or
a processing parameter associated with the application.

25. The method of claim 23,
wherein the third variable comprises a coefficient that is in accordance with the RLC mode.

26. The method of claim 25,
wherein the coefficient is:
equal to one in accordance with the RLC UM or
greater than or equal to one in accordance with the RLC AM.

27. The method of claim 25,
wherein the coefficient is in accordance with a number of RLC automatic repeat requests associated with the application.

28. The method of claim 23,
wherein the modified reassembly timing value is in accordance with an average value of a set of hybrid automatic repeat request latency time values between retransmissions.

29. The method of claim 23, wherein the modified reordering timing value is in accordance with a sum of a processing delay value and the modified reassembly timing value.

30. The method of claim 29, wherein the processing delay value corresponds to a processing delay associated with an F1-U interface between a distributed unit and a central unit.

* * * * *